United States Patent
Maruyama

(10) Patent No.: US 10,461,649 B2
(45) Date of Patent: Oct. 29, 2019

(54) SWITCHED-MODE POWER SUPPLY CIRCUIT

(71) Applicant: FUJI ELECTRIC CO., LTD., Kanagawa (JP)

(72) Inventor: Hiroshi Maruyama, Matsumoto (JP)

(73) Assignee: FUJI ELECTRIC CO., LTD., Kanagawa (JP)

(*) Notice: Subject to any disclaimer, the term of this patent is extended or adjusted under 35 U.S.C. 154(b) by 0 days.

(21) Appl. No.: 16/114,212

(22) Filed: Aug. 28, 2018

(65) Prior Publication Data

US 2019/0115841 A1 Apr. 18, 2019

(30) Foreign Application Priority Data

Oct. 18, 2017 (JP) .................................. 2017-202232

(51) Int. Cl.
*H02M 3/335* (2006.01)
*H02M 3/156* (2006.01)
*H02M 1/36* (2007.01)
*H02M 1/00* (2006.01)

(52) U.S. Cl.
CPC .......... *H02M 3/33523* (2013.01); *H02M 1/36* (2013.01); *H02M 3/156* (2013.01); *H02M 2001/0035* (2013.01); *H02M 2001/0041* (2013.01)

(58) Field of Classification Search
CPC .... H02M 3/33523; H02M 1/36; H02M 3/156; H02M 2001/0041; H02M 2001/0035
See application file for complete search history.

(56) References Cited

U.S. PATENT DOCUMENTS

| 8,242,765 | B2* | 8/2012 | Kunimatsu | H02M 3/156 363/283 |
| 2009/0180302 | A1 | 7/2009 | Kawabe et al. | |
| 2013/0003421 | A1* | 1/2013 | Fang | H02M 3/33523 363/21.01 |
| 2016/0087519 | A1* | 3/2016 | Hayakawa | H02M 3/33507 363/21.12 |
| 2017/0237356 | A1* | 8/2017 | Chen | H02M 3/33553 363/21.02 |
| 2018/0342954 | A1* | 11/2018 | Chung | H02M 3/33507 |

FOREIGN PATENT DOCUMENTS

JP   2009165316 A   7/2009

* cited by examiner

*Primary Examiner* — Kyle J Moody

(57) ABSTRACT

A switched-mode power supply circuit that performs a burst-mode operation to stop and restart switching is provided, including: a power supply that supplies DC voltage; a switching element that controls the switching; a first comparator that detects an output voltage of the switched-mode power supply circuit; a storage element that stores an output of the first comparator according to a timing of controlling the switching; and a determination unit that measures a time period for which at least one of an output of the first comparator or an output of the storage element continues to be higher than the predetermined voltage, and if the measurement is not reset within a predetermined elapsed time, determines that the switched-mode power supply circuit is in an overvoltage state, wherein the switched-mode power supply circuit resets the measurement at a timing corresponding to a switching stop timing in the burst-mode operation.

12 Claims, 11 Drawing Sheets

SWITCHED-MODE POWER SUPPLY CIRCUIT

The contents of the following Japanese patent application(s) are incorporated herein by reference:
NO. 2017-202232 filed in JP on Oct. 18, 2017.

BACKGROUND

1. Technical Field

The present invention relates to a switched-mode power supply circuit.

2. Related Art

Conventionally, switched-mode power supply circuits for supplying DC voltage to a load have been known (for example, see Patent Document 1).

Patent document 1: Japanese Patent Application Publication No. 2009-165316 (FIGS. 6 and 7)

For switched-mode power supply circuits, it is desirable to implement overvoltage protection with no erroneous operation.

SUMMARY

In a first aspect of the present invention, a switched-mode power supply circuit that performs a burst-mode operation to stop and restart switching is provided. The switched-mode power supply circuit includes a power supply that supplies DC voltage, and a switching element that is connected to the power supply and controls the switching. The switched-mode power supply circuit includes a first comparator that detects whether an output voltage of the switched-mode power supply circuit is higher than a predetermined voltage, and a storage element that stores an output of the first comparator according to a timing of controlling the switching by the switching element. The switched-mode power supply circuit includes a determination unit that measures a time period for which at least one of an output of the first comparator or an output of the storage element continues to be higher than the predetermined voltage, and if the measurement is not reset within a predetermined elapsed time, determines that the switched-mode power supply circuit is in an overvoltage state. The switched-mode power supply circuit resets the measurement at a timing corresponding to a switching stop timing in the burst-mode operation.

The switched-mode power supply circuit may reset the measurement according to a feedback voltage corresponding to the output voltage of the switched-mode power supply circuit. The switched-mode power supply circuit may reset the measurement at a same timing as the switching stop timing in the burst-mode operation.

The determination unit may include a latch timer that performs the measurement. If the latch timer is not reset within the predetermined elapsed time after the latch timer starts the measurement, the determination unit may determine that the switched-mode power supply circuit is in an overvoltage state. The switched-mode power supply circuit may reset the latch timer at a timing corresponding to the switching stop timing in the burst-mode operation.

The storage element may be a flip-flop circuit. The flip-flop circuit may store an output of the first comparator in synchronization with a clock signal, and may output a signal to reset the measurement when a reset signal is input to the flip-flop circuit.

The switched-mode power supply circuit may further include a transformer. The transformer may include a primary winding, and a secondary winding that is magnetically coupled with the primary winding and has an opposite polarity to the primary winding. The transformer may include an auxiliary winding that is magnetically coupled with the primary winding and has an opposite polarity to the primary winding. The power supply may be connected to the primary winding. The switching element may control conduction between the power supply and the primary winding. The switched-mode power supply circuit may generate a control signal for the switching element based on a feedback voltage corresponding to the output voltage of the switched-mode power supply circuit and a voltage induced in the auxiliary winding.

The switched-mode power supply circuit may further include a second comparator. The first comparator may compare a first input voltage and a first reference voltage, the first input voltage being the voltage induced in the auxiliary winding, the first reference voltage being a threshold of the overvoltage state, and if the first input voltage is higher than the first reference voltage, output a signal indicating the overvoltage state. The second comparator may output a signal instructing to stop switching based on a result of comparing a second input voltage and a second reference voltage, the second input voltage being the feedback voltage corresponding to the output voltage of the switched-mode power supply circuit, the second reference voltage being a threshold on whether the second input voltage is an excessively low voltage. The switched-mode power supply circuit may reset the measurement according to the output of the second comparator.

In a second aspect of the present invention, a switched-mode power supply circuit that performs a burst-mode operation to stop and restart switching is provided. The switched-mode power supply circuit includes a power supply that supplies DC voltage, and a switching element that is connected to the power supply and controls the switching. The switched-mode power supply circuit includes an overvoltage detection circuit that detects whether an output voltage of the switched-mode power supply circuit is an overvoltage according to a timing of controlling the switching by the switching element. The switched-mode power supply circuit includes a latch circuit that generates a latch signal when a number of times an overvoltage is continuously detected by the overvoltage detection circuit reaches a predetermined number of times. The switched-mode power supply circuit resets the number of times at a timing corresponding to a switching stop timing in the burst-mode operation.

The switched-mode power supply circuit may reset the number of times according to a feedback voltage corresponding to the output voltage of the switched-mode power supply circuit. The switched-mode power supply circuit may reset the number of times at a same timing as the switching stop timing in the burst-mode operation.

The switched-mode power supply circuit may further include a counter circuit that counts a number of times an overvoltage is continuously detected by the overvoltage detection circuit. The latch circuit may generate the latch signal when the number of times counted by the counter circuit reaches a predetermined number of times. The switched-mode power supply circuit may reset the counter circuit at the timing corresponding to the switching stop timing in the burst-mode operation.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
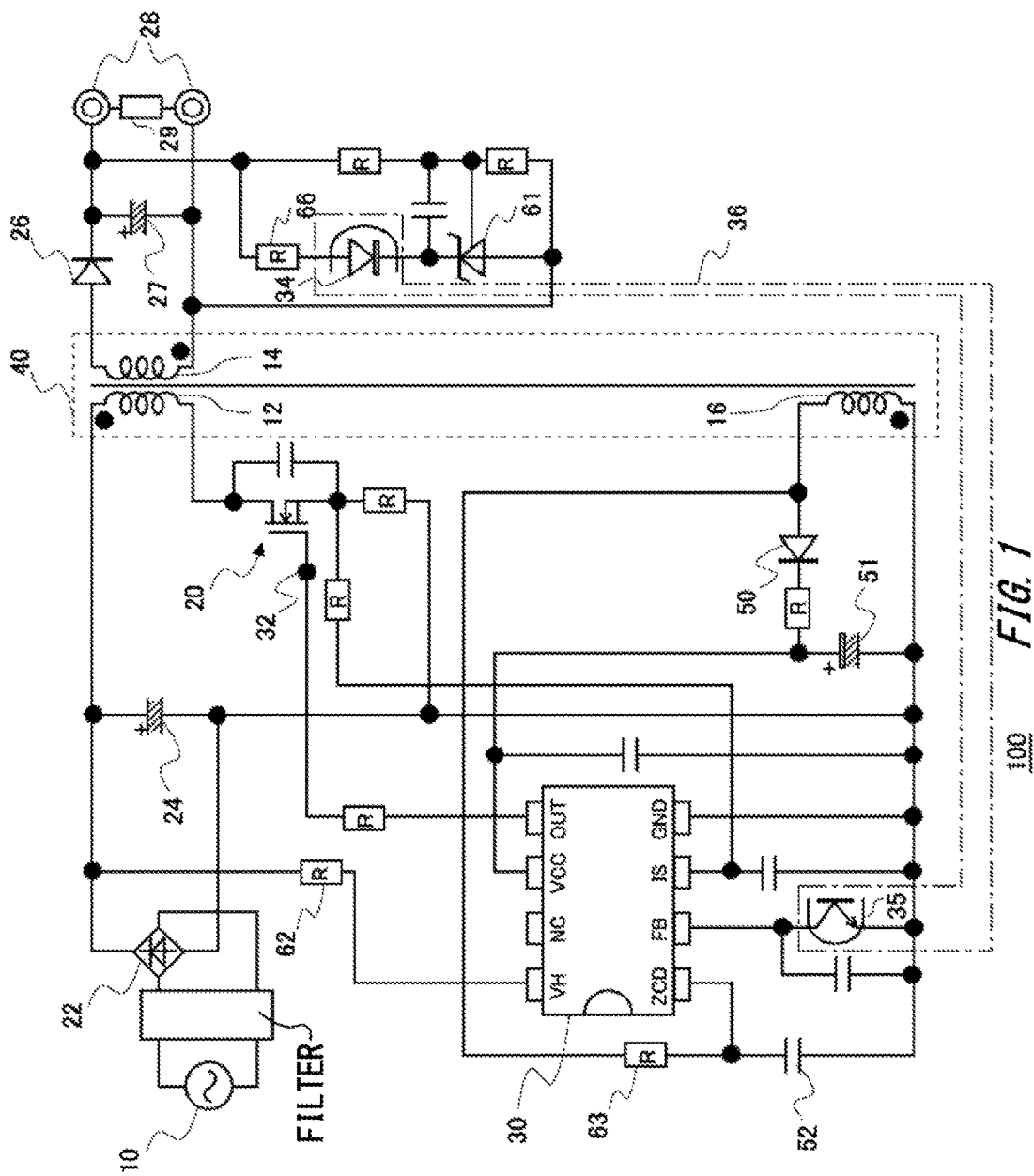
FIG. 1 shows an example of a switched-mode power supply circuit 100 according to the present embodiment.

FIG. 1 shows an example of a switched-mode power supply circuit 100 according to the present embodiment. The switched-mode power supply circuit 100 of the present example includes a power supply 10, a switching element 20, and a control circuit 30. The switched-mode power supply circuit 100 supplies electrical power to a load 29.

The switched-mode power supply circuit 100 may include a transformer 40, for example. The transformer 40 has a primary winding 12, a secondary winding 14 magnetically coupled with the primary winding 12, and an auxiliary winding 16 magnetically coupled with the primary winding 12 and the secondary winding 14, for example. The secondary winding 14 may be set to have an opposite polarity to the primary winding 12. In this case, the transformer 40 of the present example is of a fly-back type. The auxiliary winding 16 is set to have the same polarity as the secondary winding 14, and is provided for supplying the power source to the control circuit 30 and for monitoring the output voltage induced in the secondary winding 14. The voltage induced in the auxiliary winding 16 is proportional to the voltage induced in the secondary winding 14. The constant of this proportionality is determined according to the ratio between the number of turns of the auxiliary winding 16 and the number of turns of the secondary winding 14. The voltage induced in the secondary winding 14 is rectified by a diode 26 and smoothened by a capacitor 27 to be converted into a DC voltage, which is then supplied to an output terminal 28.

The power supply 10 supplies DC voltage to the primary winding 12 of the transformer 40. In the present example, the power supply 10 is an AC power supply, for example. The AC voltage generated by the power supply 10 is rectified by a diode bridge 22 and smoothened by a capacitor 24 to be converted into a DC voltage, which is then supplied to the primary winding 12 of the transformer 40. Note that a DC power supply such as a battery may be connected to the primary winding 12 of the transformer 40.

The switching element 20 controls conduction between the power supply 10 and the primary winding 12 of the transformer 40. The switching element 20 has a control terminal 32, and controls conduction between the power supply 10 and the primary winding 12 according to control signals input to the control terminal 32 for ON/OFF control. The control signals are generated based on the voltage fed back to an FB terminal of the control circuit 30 and the voltage induced in the auxiliary winding 16. The switching element 20 is a power MOSFET, for example.

A light-emitting diode 34 is connected to one end of the output terminal 28 via a resistance 66. The light-emitting diode 34 constitutes a photocoupler 36 with a phototransistor 35, which is on the side of the primary winding 12. The output voltage of the output terminal 28 is fed back to the FB terminal of the control circuit 30 through the photocoupler 36. A shunt regulator 61 monitors the output voltage of the output terminal 28.

The control circuit 30 outputs a signal to the control terminal 32 for ON/OFF control of the switching element 20. The control circuit 30 also varies the ON time of the switching element 20 to convert the output voltage of the output terminal 28 into a constant voltage. The switched-mode power supply circuit 100 of the present example may be a quasi-resonant power supply circuit.

The control circuit 30 determines whether the voltage induced in the auxiliary winding 16 is larger than a predetermined reference value. In this manner, it can be determined whether the output voltage induced in the secondary winding 14 is an overvoltage. If the time for which it is determined to be an overvoltage continues for a predetermined time (60 μs in the present example), the control circuit 30 outputs a signal to turn off the switching element 20, protecting the switched-mode power supply circuit 100 and the load 29 from being damaged due to the overvoltage.

The AC voltage generated at one end of the auxiliary winding 16 in association with the switching of the switching element 20 is input to a terminal ZCD for zero-voltage crossing detection (also used for overvoltage detection as described later) of the control circuit 30. The AC voltage generated at the one end of the auxiliary winding 16 is also rectified by a diode 50, smoothened by a capacitor 51, and input to a power supply terminal VCC of the control circuit 30. The other end of the auxiliary winding 16 is grounded.

The voltage generated by the AC power supply 10 and rectified by the diode bridge 22 is input to a high-voltage input terminal VH of the control circuit 30 via a resistance 62. A ground terminal GND of the control circuit 30 is grounded. An NC terminal of the control circuit 30 is a dummy terminal that is connected to nothing.

Figure 2:
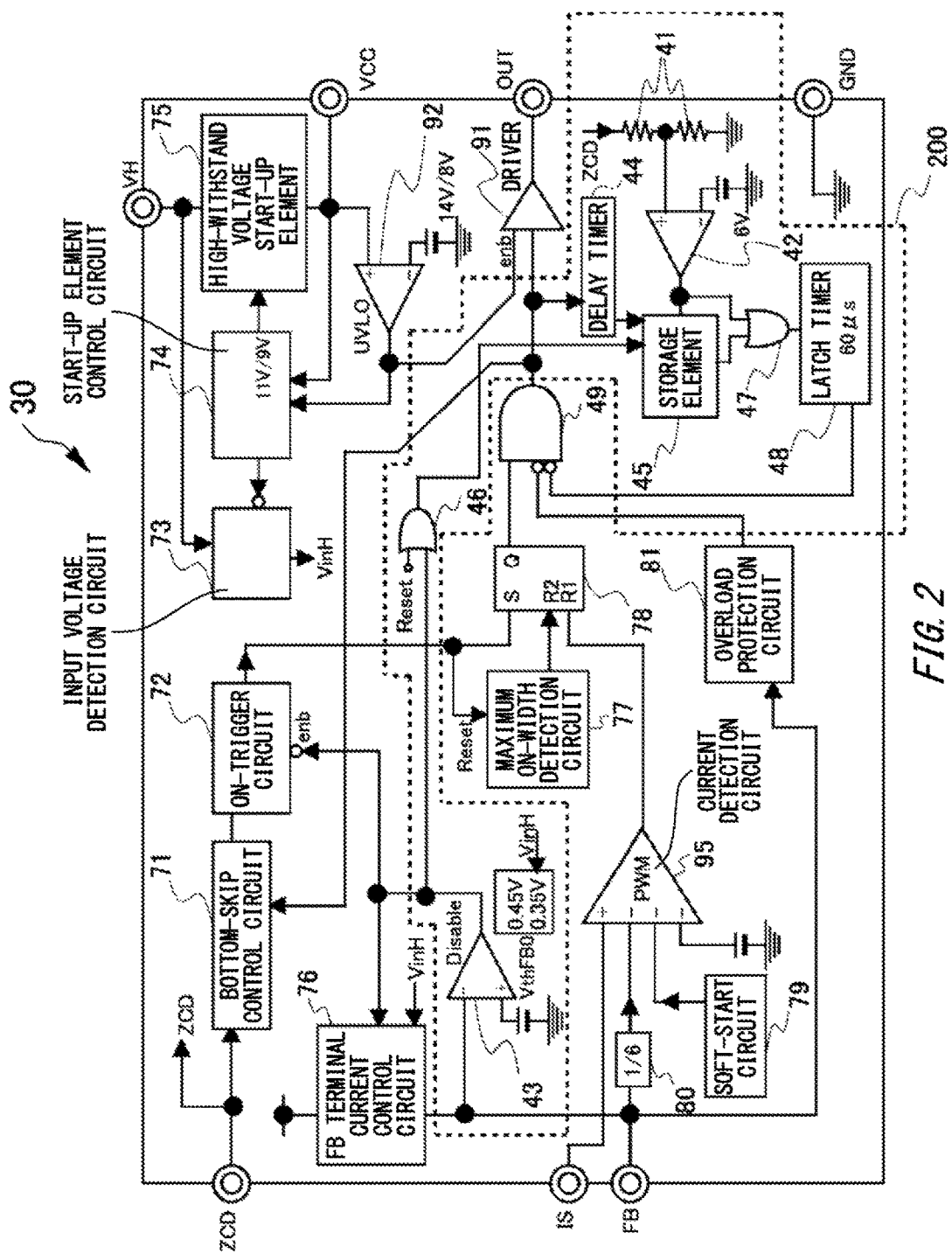
FIG. 2 shows an example block diagram of a control circuit 30.

FIG. 2 shows an example block diagram of the control circuit 30. As shown in FIG. 2, the control circuit 30 has a ZCD terminal to which the AC voltage generated at one end of the auxiliary winding 16 is input, an IS terminal to which a voltage signal resulted from detection of the current flowing in the switching element 20 is input, an FB terminal to which a voltage corresponding to the output voltage of the output terminal 28 is fed back, and a VH terminal to which the voltage of the AC power supply 10 is input. The control circuit 30 also has a VCC terminal for power supply, an OUT terminal for outputting a signal for ON/OFF control of the switching element 20, and a GND terminal that is grounded.

The voltage input to the VH terminal is input to an input voltage detection circuit 73 and a high-withstand voltage start-up element 75. The VCC terminal is connected to a start-up element control circuit 74 and a non-inverting input terminal of a comparator 92. The comparator 92 compares the power supply voltage supplied from the VCC terminal and a predetermined threshold voltage, and if the power supply voltage supplied from the VCC terminal is lower than the threshold voltage, determines that the switched-mode power supply circuit 100 is in Under Voltage Lock Out (UVLO) state.

The start-up element control circuit 74 controls the stopping of the high-withstand voltage start-up element 75 according to the output of the comparator 92 and the power supply voltage from the VCC terminal. The high-withstand voltage start-up element 75 generates an initial power supply voltage (the voltage of the VCC terminal) by supplying a predetermined current to the capacitor 51 to charge the capacitor 51 while reducing the high voltage input to the VH terminal at the time of start-up. When determining that the power supply voltage from the VCC terminal is more than or equal to a predetermined voltage, the start-up element control circuit 74 stops the high-withstand voltage start-up element 75, so as to prevent the power loss due to the high-withstand voltage start-up element 75. Once the power supply voltage from the VCC terminal rises, the switched-mode power supply circuit 100 starts switching operations, so that the power supply voltage of the control circuit 30 is generated by the voltage induced in the auxiliary winding 16.

The input voltage detection circuit 73 determines the magnitude of the voltage input to the high-voltage input terminal VH, into which the voltage of the AC power supply 10 is rectified, and outputs a signal VinH instructing to switch reference voltages in the control circuit 30. The signal VinH is used for a second reference voltage VthFB0 of a second comparator 43, for example. The signal VinH is also used for switching the reference voltage of an FB terminal current control circuit 76, for example. The second comparator 43 will be described in detail later with reference to FIG. 3.

A bottom-skip control circuit 71 functions to adjust the number of times the bottom voltage of resonance is counted until the switching element 20 is turned on, so as to prevent the frequency from being excessively increased when the load 29 is light. The FB terminal current control circuit 76 is a circuit to supply electrical current to the phototransistor 35 via the FB terminal, and controls the magnitude of its output current according to the signal VinH and the output of the second comparator 43.

In response to an input from the bottom-skip control circuit 71 and an enable signal, an ON-trigger circuit 72 provides an ON-trigger signal, on which the rise timing of the switching element 20 is based, to a set terminal of an RS flip-flop circuit 78. The ON-trigger circuit 72 also outputs a reset (Reset) signal to a maximum ON-width detection circuit 77. The RS flip-flop circuit 78 is reset in response to a reset signal from the maximum ON-width detection circuit 77 or a current detection circuit 95, and outputs a signal to turn off the switching element 20.

A voltage divider circuit 80 divides the voltage of the FB terminal, and outputs the divided voltage to the current detection circuit 95. The voltage divider circuit 80 of the present example divides the voltage from the FB terminal into one-sixth, for example.

The current detection circuit (PWM) 95 compares the voltage resulted from detection of the current flowing in the switching element 20 and input from the IS terminal with the lowest one of the voltage from the voltage divider circuit 80, the voltage from a soft-start circuit 79 and the voltage from a constant voltage source, and provides a reset signal R1 to the RS flip-flop circuit 78 based on the comparison result. The soft-start circuit 79 functions to prevent failure due to the rush current caused at the time of start-up of the switched-mode power supply circuit 100. A voltage divider circuit 41, a first comparator 42, a delay timer 44, a storage element 45, an OR circuit 46, and an OR circuit 47 will be described in detail later with reference to FIG. 3.

An overload protection circuit 81 determines whether an overload occurs based on the voltage of the FB terminal, and when determining that an overload occurs, turns off the switching element 20 via a three-input AND circuit 49. The three-input AND circuit 49 has an active-high input terminal, to which the output of the RS flip-flop circuit 78 is input. The three-input AND circuit 49 also has active-low input terminals, to which the output of the overload protection circuit 81 and the output of a latch timer 48 are input. When an enable (enb) signal from the comparator 92 instructs to enable, a driver circuit 91 amplifies the output of the three-input AND circuit 49 and outputs it to the OUT terminal.

Figure 3:
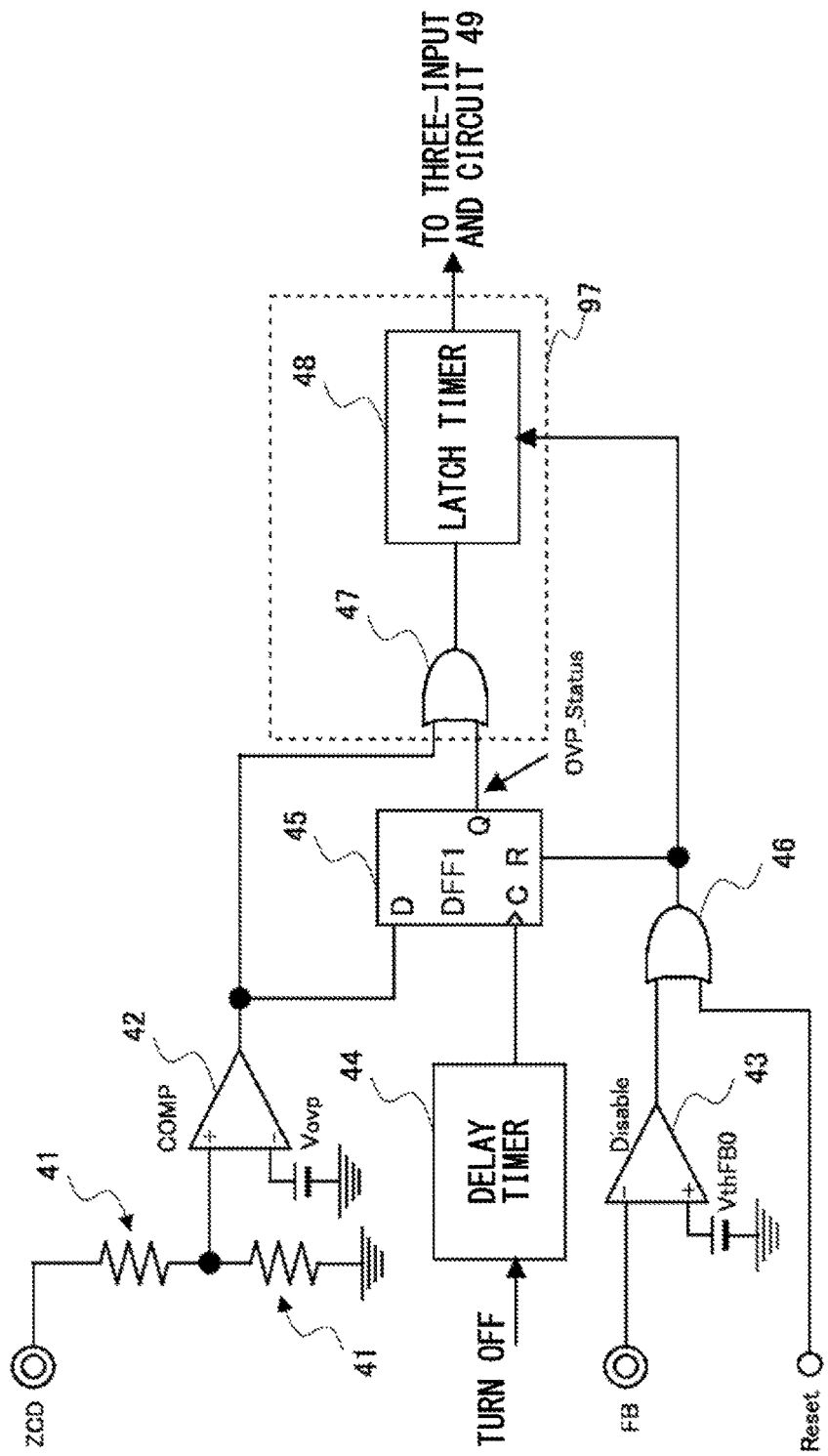
FIG. 3 shows the details of an example of an OVP circuit 200.

FIG. 3 shows the details of an example of an OVP (overvoltage protection) circuit 200, enclosed by dashed line in the block diagram shown in FIG. 2. As shown in FIG. 3, the OVP circuit 200 of the present example includes a first comparator 42, a second comparator 43, a storage element 45, and a latch timer 48, for example.

A voltage divider circuit 41 divides the voltage induced in the auxiliary winding 16 and input through the ZCD terminal. The first comparator 42 compares the magnitudes of the divided voltage and a predetermined first reference voltage Vovp. The first reference voltage Vovp is the threshold on whether the voltage into which the voltage input through the ZCD terminal is divided by the voltage divider circuit 41 is an overvoltage. The voltage divider circuit 41 is provided for adjusting the voltage input to the first comparator 42 to be in an appropriate operational range. The division ratio of the voltage divider circuit 41 is determined in consideration of the maximum voltage input to the ZCD terminal and operational characteristics of the first comparator 42. The divided voltage of the voltage input through the ZCD terminal is input to the first comparator 42 as a first input voltage. If the first input voltage is higher than the first reference voltage Vovp, the first comparator 42 outputs an H (High) level signal, and if the first input voltage is lower than the first reference voltage Vovp, the first comparator 42 outputs an L (Low) level signal.

The storage element 45 reads and stores the output of the first comparator 42 in synchronization with a clock signal C. The clock signal C is input to the storage element 45 at a timing delayed by a delay timer 44 by a predetermined time from the timing when the switching element 20 is turned off. The storage element 45 is a D flip-flop circuit, for example. The timing will be described later with reference to FIG. 5.

A determination unit 97 measures the time period for which at least one of the output of the first comparator 42 or the output of the storage element 45 continues to be higher than the first reference voltage Vovp, and if the measurement is not reset within a predetermined elapsed time, determines that the switched-mode power supply circuit 100 is in an overvoltage state. The determination unit 97 includes an OR circuit 47 and the latch timer 48, for example.

The OR circuit 47 outputs the logical disjunction of the output of the first comparator 42 and the output of the storage element 45. The resulted logical disjunction obtained by the OR circuit 47 is input to the latch timer 48. That is, due to the presence of the OR circuit 47, the output of the first comparator 42 can be input to the latch timer 48 independently of the output of the storage element 45. In this configuration, latch protection of the switched-mode power supply circuit 100 can be compulsorily performed by pulling up the ZCD terminal of the control circuit 30 with an external signal. In the present example, latch protection of the switched-mode power supply circuit 100 can be performed by pulling up the ZCD terminal to the VCC terminal voltage for a time period of 60 μs or more using a photocoupler or the like to cause a latch signal (an H level signal) to be output to the three-input AND circuit 49.

The latch timer 48 is a circuit to measure the elapsed time from when an H level signal is input from the OR circuit 47 until when an L level signal is input, and determine and store whether the elapsed time reaches a predetermined time Tlat1. If the elapsed time reaches the time Tlat1, the determination unit 97 determines that the switched-mode power supply circuit 100 is in an overvoltage state. The latch timer 48 stores that the time Tlat1 is reached, and outputs a signal to turn off the switching element 20. When the output of the OR circuit 47 becomes L level before the elapsed time reaches the time Tlat1, the latch timer 48 is reset. When the elapsed time reaches the time Tlat1, even if the output of the OR circuit 47 becomes L level, only the measurement of the elapsed time is reset and the stored information that the elapsed time has reached the time Tlat1 is not reset. Accordingly, when the elapsed time reaches the time Tlat1, the signal input from a Reset terminal is set to H level to reset the latch timer 48. The time Tlat1 is 60 μs, for example.

Here, the latch timer 48 can be implemented either by using analog circuit techniques or by using digital circuit techniques. The analog circuit techniques may include, for example, a combination of a capacitor, a circuit for switching between the discharging and constant current-charging of the capacitor according to the output of the OR circuit 47, a comparator for comparing the charged voltage of the capacitor and a reference voltage, and a circuit for storing the output of the comparator, or the like. The digital circuit techniques may include, for example, a combination of a counter for switching between counting up with a base clock of a constant period and resetting according to the output of the OR circuit 47, and a circuit which detects and stores that the counted value of the counter reaches a predetermined value, or the like.

The second comparator 43 compares the magnitude of the FB terminal voltage (i.e. feedback voltage), which corresponds to the output voltage of the output terminal 28, and the magnitude of the second reference voltage VthFB0. As described later, the output voltage of the output terminal 28 increases as the load 29 is lighter, and the FB terminal voltage decreases as the output voltage of the output terminal 28 is higher, and therefore the FB terminal voltage serves as an indication of the magnitude of the load. The second reference voltage VthFB0 is the threshold on whether to stop the switching operation of the switched-mode power supply circuit 100 by burst-mode operation when the load 29 is light. If the FB terminal voltage, which is input as a second input voltage, is higher than the second reference voltage VthFB0, the second comparator 43 outputs an L level signal, and if the second input voltage is lower than the second reference voltage VthFB0, the second comparator 43 outputs an H level signal. The H level signal output from the second comparator 43 is input to an active-low enable terminal of the ON-trigger circuit 72 shown in FIG. 2. The ON-trigger circuit 72 in response stops its operation, so that no set signal is input to the RS flip-flop circuit 78, and therefore the switching operation is stopped. The second reference voltage VthFB0 is 0.45 V, for example.

An OR circuit 46 outputs the logical disjunction of the output of the second comparator 43 and the input from the Reset terminal. The resulted logical disjunction obtained by the OR circuit 46 is input to a reset terminal R of the storage element 45.

The storage element 45 is reset by an H level signal output from the second comparator 43. When the storage element 45 is reset by the H level signal output from the second comparator 43, the storage element 45 outputs a signal to reset the measurement of the latch timer 48. To compulsorily reset the storage element 45 and the latch timer 48, an H level signal is input from the Reset terminal shown in FIG. 3.

Figure 4:
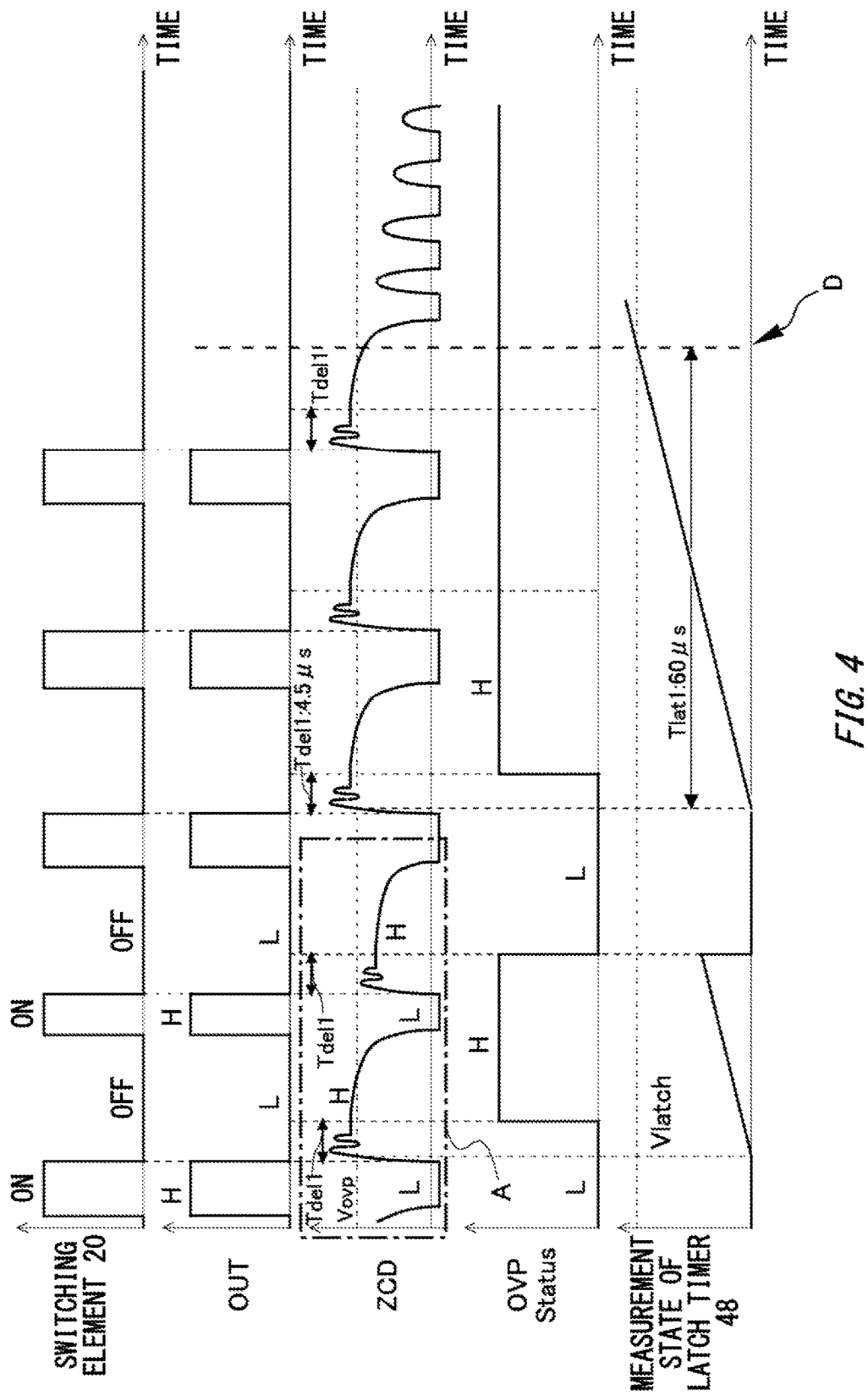
FIG. 4 is an example timing chart showing the operation of the switched-mode power supply circuit 100 according to the present embodiment.

FIG. 4 is an example timing chart showing the operation of the switched-mode power supply circuit 100 according to the present embodiment. FIG. 4 shows the operation of the switching element 20, the voltages of the OUT terminal and ZCD terminal of the control circuit 30, the output, OVP_Status, of the storage element 45, and the operation of the latch timer 48 in the time series. As shown in FIG. 4, when the voltage of the OUT terminal input to the control terminal 32 is at H level, instructing to turn on, the switching element 20 is turned on, and when it is at L level, instructing to turn off, the switching element 20 is turned off.

Note that the ON-to-OFF transition and OFF-to-ON transition of the switching element 20 in actuality respectively have some delay relative to the ON-to-OFF transition and OFF-to-ON transition of the OUT terminal, such as due to parasitic capacitance inherent in the control terminal 32, while FIG. 4 is shown with the delay being omitted.

When the ON-to-OFF transition of the switching element 20 occurs, a voltage proportional to the voltage of the secondary winding 14 is generated in the auxiliary winding 16. The constant of this proportionality is determined according to the ratio between the number of turns of the auxiliary winding 16 and the number of turns of the secondary winding 14. The voltage generated in the auxiliary winding 16 is input to the ZCD terminal of the control circuit 30 via a resistance 63. The resistance 63 is provided so that the maximum voltage applied to the voltage divider circuit 41 does not exceed the allowable maximum input voltage of the control circuit 30. In addition, a capacitor 52 is externally provided between the ZCD terminal and the ground in order to adjust the timing of zero-voltage crossing detection. In the above configuration, the output voltage of the switched-mode power supply circuit 100 can be detected indirectly from the voltage of the ZCD terminal during the OFF state of the switching element 20. The reference voltage Vovp is the threshold to determine whether the output voltage of the switched-mode power supply circuit 100 is an overvoltage. At the timing when the clock is input, if the first input voltage from the ZCD terminal is larger than the first reference voltage Vovp, the output OVP_Status of the storage element 45 becomes H level, and if the first input voltage is smaller than the first reference voltage Vovp, it becomes L level.

Figure 5:
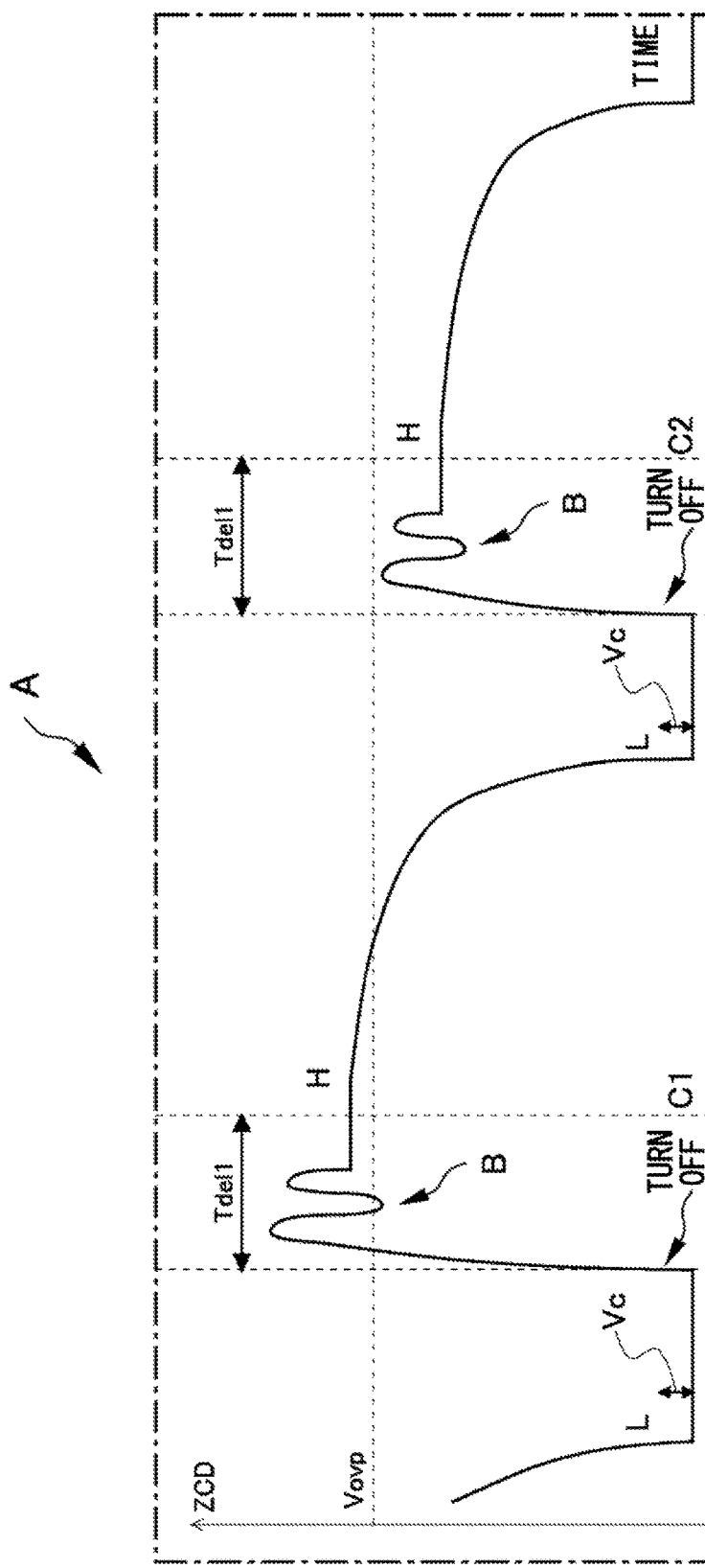
FIG. 5 is an enlarged view of region A in FIG. 4.

FIG. 5 is an enlarged view of region A of the voltage waveform of the ZCD terminal in FIG. 4. As shown in FIG. 5, when the voltage of the ZCD terminal transitions abruptly from L level to H level, ringing B may occur. Note that the L level and H level in the voltage waveform of the ZCD terminal are different from those of typical binary signals. As described later, the L level indicates the state in which the voltage of the ZCD terminal is clamped at a negative potential Vc during the time period for which the switching element 20 is turned on, while the H level indicates the state in which the voltage of the ZCD terminal is not clamped at the negative potential Vc but is a positive voltage (the same applies hereinafter). When determining whether an overvoltage occurs according to the voltage of the ZCD terminal, it is determined whether the voltage of the ZCD terminal exceeds the first reference voltage Vovp, indicated by dashed line, at the timing delayed by a delay time Tdel1 from the timing when the switching element 20 is turned off, so as not to determine that the voltage of the ZCD terminal is an overvoltage by detecting an overvoltage temporarily caused by ringing B. The delay time Tdel1 is 4.5 μs, for example.

For example, as shown in FIG. 5, at time C1 when the delay time Tdel1 has elapsed, the ZCD terminal voltage exceeds the first reference voltage Vovp, and therefore it is determined that the switched-mode power supply circuit 100 is in an overvoltage state. At time C2, the ZCD terminal voltage does not exceed the first reference voltage Vovp, and therefore it is determined that the switched-mode power supply circuit 100 is not in an overvoltage state.

During the time period for which the switching element 20 is turned on, the voltage of the ZCD terminal may be clamped at the negative potential Vc by an input protection diode or parasitic diode of the control circuit 30. In the present example, Vc is about −0.7 V, for example.

Since it is determined whether the voltage of the ZCD terminal exceeds the first reference voltage Vovp at the timing delayed by the delay time Tdel1 from the timing when the switching element 20 is turned off (the output of the three-input AND circuit 49 falls), a signal delayed by the delay timer 44 by the delay time Tdel1 from the timing of turning-off of the switching element 20 (falling of the output of the three-input AND circuit 49) is input to a clock terminal C of the storage element 45, as shown in FIG. 4. The storage element 45 reads and stores a signal input to a D terminal when receiving a fall signal input to the clock terminal C. If the voltage of the ZCD terminal exceeds the first reference voltage Vovp at the timing delayed by the delay time Tdel1, the output Q (OVP_status) of the storage element 45 becomes H level, as shown in FIG. 4.

At the timing when the OR circuit 47 outputs H level, the latch timer 48 begins to measure the time for which the OR circuit 47 maintains H level. The output of the first comparator 42 and the output Q (OVP_status) of the storage element 45 are input to the OR circuit 47, and the output of the first comparator 42 first becomes H level at the timing when the voltage of the ZCD terminal exceeds the first reference voltage Vovp, and therefore the OR circuit 47 outputs H level when the output of the first comparator 42 becomes H level. When the switching element 20 transitions to ON state, the output of the first comparator 42 becomes L level, but the output of the storage element 45 is at H level, and therefore the latch timer 48 continues to measure the time for which the OR circuit 47 maintains H level.

When the voltage of the ZCD terminal continues to exceed the first reference voltage Vovp at the timing when the delay time Tdel1 has elapsed after the switching element 20 is turned off for a plurality of cycles, and the measurement time reaches Tlat1, the determination unit 97 determines that the switched-mode power supply circuit 100 is in an overvoltage state. In this case, the latch timer 48 outputs an H level signal (a latch signal) indicating the overvoltage state. In the three-input AND circuit 49, the signal of the active-low input terminal becomes H level, and therefore its output becomes L level. Then, the switching operation of the switched-mode power supply circuit 100 stops, and the latch protection is operated. This timing is indicated by D in FIG. 4. Even if the voltage of the ZCD terminal exceeds the first reference voltage Vovp, as long as the voltage of the ZCD terminal does not exceed the first reference voltage Vovp in a subsequent cycle before reaching the latch time Tlat1, the output Q of the storage element 45 is reset to OFF, and the latch protection is not operated. Vlatch shown in FIG. 4 is a threshold for the measurement state of the latch timer 48. When a signal indicating the measurement state of the latch timer 48 reaches the threshold, it is determined that the measurement time reaches Tlat1.

Figure 6:
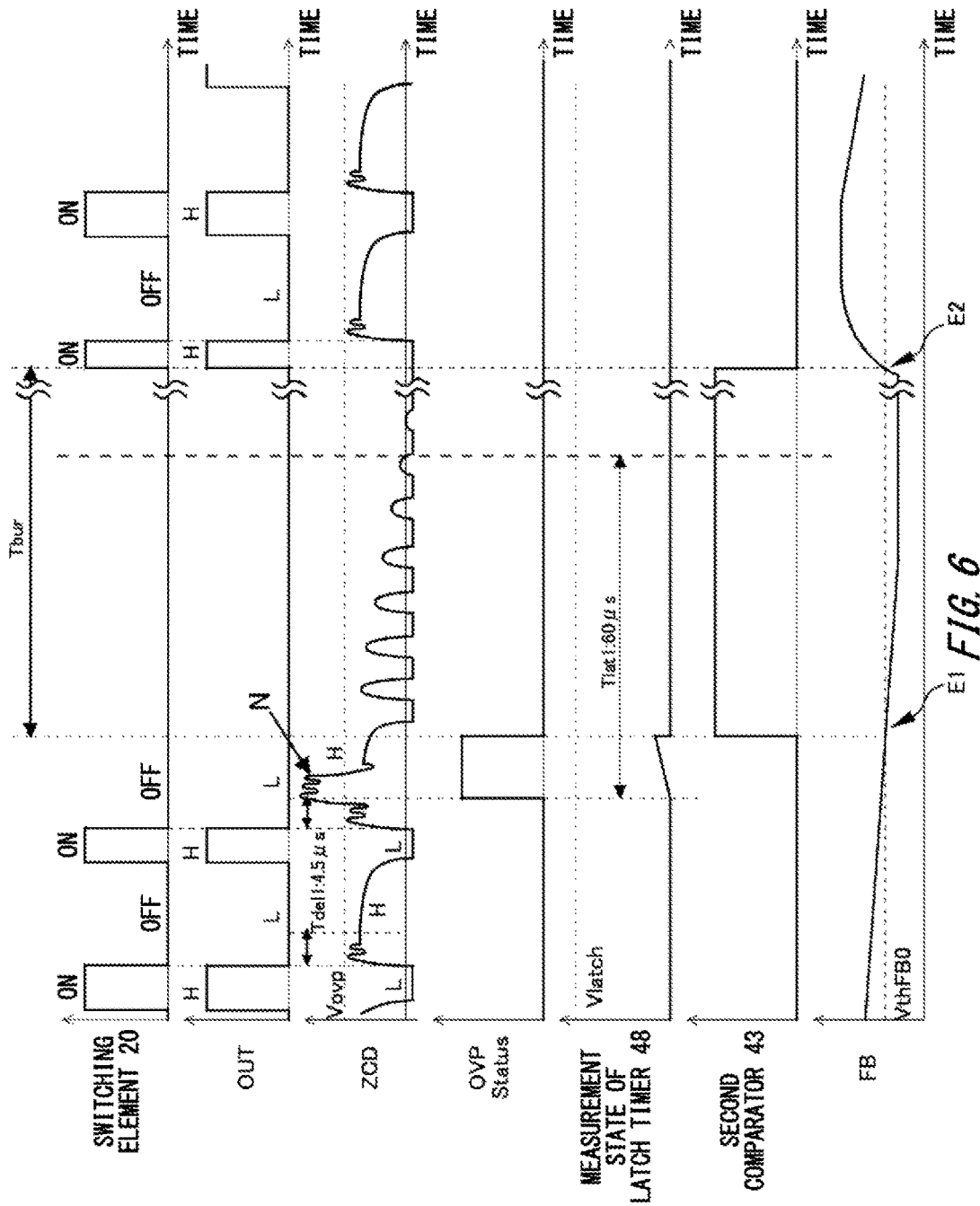
FIG. 6 is another example timing chart showing the operation of the switched-mode power supply circuit 100 according to the present embodiment.

FIG. 6 is another example timing chart showing the operation of the switched-mode power supply circuit 100 according to the present embodiment. FIG. 6 shows the operation of the switching element 20, the voltages of the OUT terminal and ZCD terminal of the control circuit 30, the output, OVP_Status, of the storage element 45, the operation of the latch timer 48, the output of the second comparator 43, and the voltage of the FB terminal in the time series.

When the load 29 is light, the switched-mode power supply circuit 100 may perform a burst-mode operation. The burst-mode operation refers to an operation where the switching of the switched-mode power supply circuit 100 is stopped and restarted in order to reduce the switching loss when the load 29 is light or no load. In the present example, it refers to an operation where the switching of the switching element 20 is temporarily stopped when the voltage fed back to the FB terminal of the control circuit 30 from the secondary winding 14 decreases to lower than the second reference voltage VthFB0 of the second comparator 43 shown in FIG. 2, and thereafter the switching operation of the switching element 20 is restarted when the voltage fed back to the FB terminal exceeds the second reference voltage VthFB0. The second reference voltage VthFB0 is 0.45 V, for example.

In the switched-mode power supply circuit 100 of the present example, when the load 29 is light, the current supplied to the capacitor 27 from the secondary winding 14 of the transformer 40 will be excessive. Accordingly, the voltage of the output terminal 28 increases. When the voltage of the output terminal 28 increases, the amount of light emitted by the light-emitting diode 34 increases, and therefore the voltage fed back to the FB terminal of the control circuit 30 through the photocoupler 36 decreases. When the FB terminal voltage becomes lower than the second reference voltage VthFB0, the switching operation of the switching element 20 stops, and the operation of the switched-mode power supply circuit 100 stops. The timing at which the operation of the switched-mode power supply circuit 100 stops is a stop timing in the burst-mode operation. This timing is indicated by E1 in FIG. 6.

When the operation of the switched-mode power supply circuit 100 stops, the supply of current from the secondary winding 14 of the transformer 40 to the capacitor 27 stops. When the supply of current to the capacitor 27 stops, the output voltage of the output terminal 28 decreases, and therefore the voltage fed back to the FB terminal of the control circuit 30 through the photocoupler 36 increases.

When the FB terminal voltage becomes higher than the second reference voltage VthFB0, the switching operation of the switching element 20 restarts, and the operation of the switched-mode power supply circuit 100 restarts. This timing is indicated by E2 in FIG. 6.

In the last switching cycle before entering a switching stop period Tbur in the burst-mode operation, during the OFF-to-ON transition of the ZCD terminal voltage triggered by the ON-to-OFF transition of the switching element 20, if noise N is input to the ZCD terminal due to lightning surge or the like as shown in FIG. 6, an overvoltage state may be erroneously detected even after the delay time Tdel1 has elapsed. In this case, OVP_Status becomes H level, and if this goes on, no switching operation of the switching element 20 and therefore no change in OVP_Status occur during the switching stop period Tbur. Accordingly, the latch timer 48 continues to measure the time for which OVP_Status maintains H level.

In the present embodiment, at timing E1, at which the voltage fed back to the FB terminal decreases to lower than the second reference voltage VthFB0 and the output of the second comparator 43 becomes H level, the storage element 45 is reset to cause OVP_Status to be L level, so that the measurement of the latch timer 48 is reset. This can prevent the protection operation of the switched-mode power supply circuit 100 from being erroneously performed due to the latch timer 48 having measured the latch time Tlat1.

Note that, while FIG. 6 shows an example where the measurement of the latch timer 48 on the time for which OVP_Status maintains H level is reset at the same timing as the timing indicated by E1, at which an H level signal is output from the second comparator 43, the timing of resetting the measurement on the time for which OVP_Status maintains H level may be any timing corresponding to the stop timing in the burst-mode operation. That is, it may be any timing after the voltage corresponding to the voltage of the output terminal 28 decreases to lower than the second reference voltage VthFB0 and before the latch timer 48 measures the latch time Tlat1.

Note that, while the example of FIG. 6 uses the voltage fed back from the output terminal 28 for resetting the latch time measurement of the latch timer 48, any voltage other than the voltage fed back from the output terminal 28 may be used for resetting the latch time measurement, as long as it controls switching to stopping in the burst-mode operation.

Figure 7:
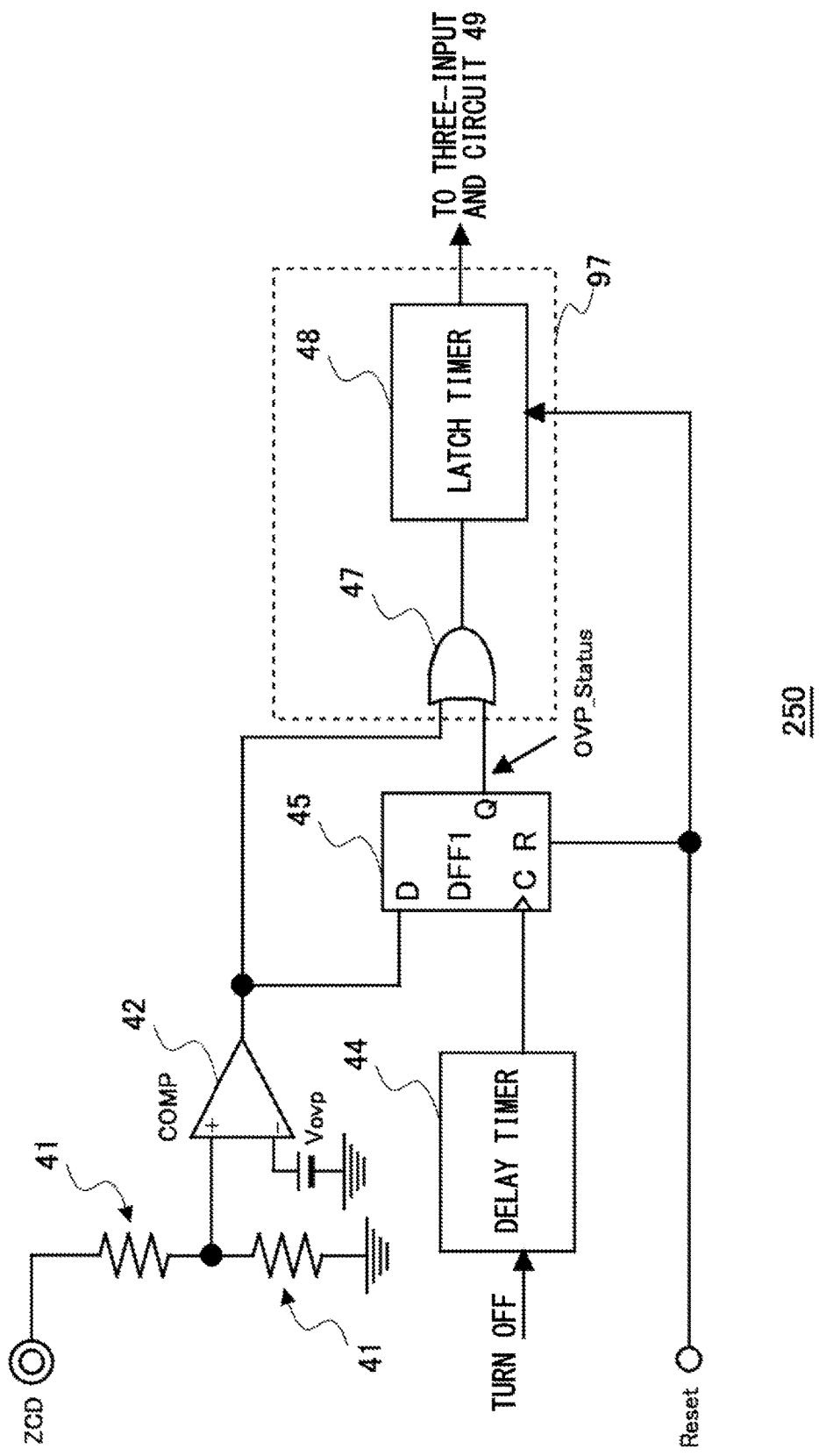
FIG. 7 shows an OVP circuit 250 of a comparative example.

FIG. 7 shows an OVP circuit 250 of a comparative example. The OVP circuit 250 of the comparative example is different from the OVP circuit 200 shown in FIG. 3 in that the second comparator 43 is not included and the reset signal is directly input to the reset terminal of the storage element 45.

Figure 8:
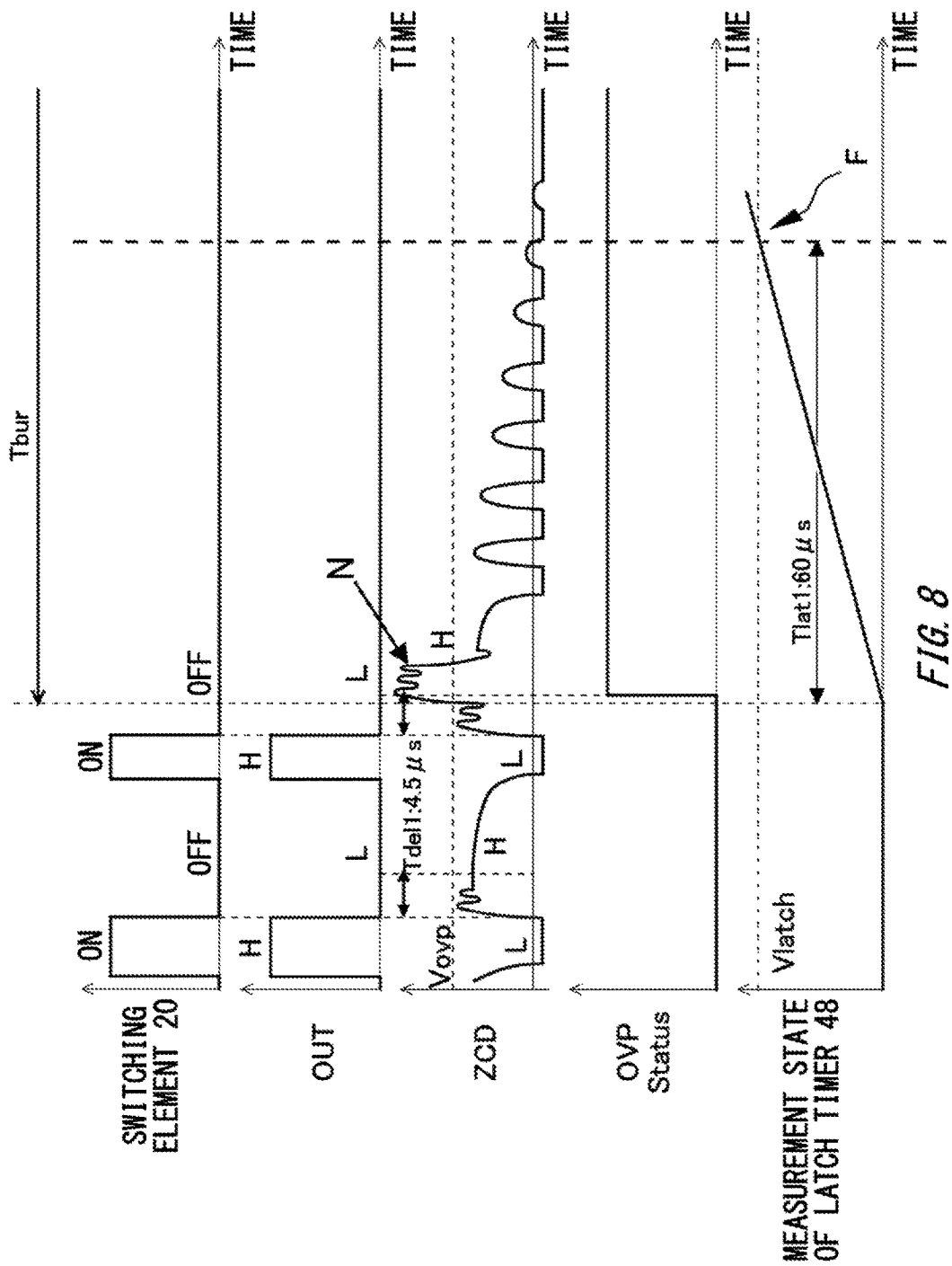
FIG. 8 is a timing chart showing the operation of the OVP circuit 250 of the comparative example.

FIG. 8 is a timing chart showing the operation of the OVP circuit 250 of the comparative example. The OVP circuit 250 of the comparative example does not include the second comparator 43. Accordingly, in the last switching cycle before entering a switching stop period Tbur in the burst-mode operation, during the rise of the ZCD terminal voltage triggered by the ON-to-OFF transition of the switching element 20, if noise N is input to the ZCD terminal due to lightning surge or the like and an overvoltage state is erroneously detected, the latch timer 48 continues to measure the time for which OVP_Status maintains H level. Accordingly, the switched-mode power supply circuit 100 erroneously performs protection operation at the timing when the latch timer 48 has measured the latch time Tlat1. This timing is indicated by F in FIG. 8.

If the switched-mode power supply circuit 100 erroneously performs a protection operation due to the noise N, the switching operation stops and the VCC terminal voltage (the power supply voltage of the control circuit 30) decreases, and the control circuit 30 enters Under Voltage Lock Out (UVLO) state due to the decreased VCC terminal voltage. When the control circuit 30 enters UVLO state, the UVLO state is not disabled until the control circuit 30 is reset. Accordingly, the switched-mode power supply circuit 100 remains in the stopped state.

Figure 9:
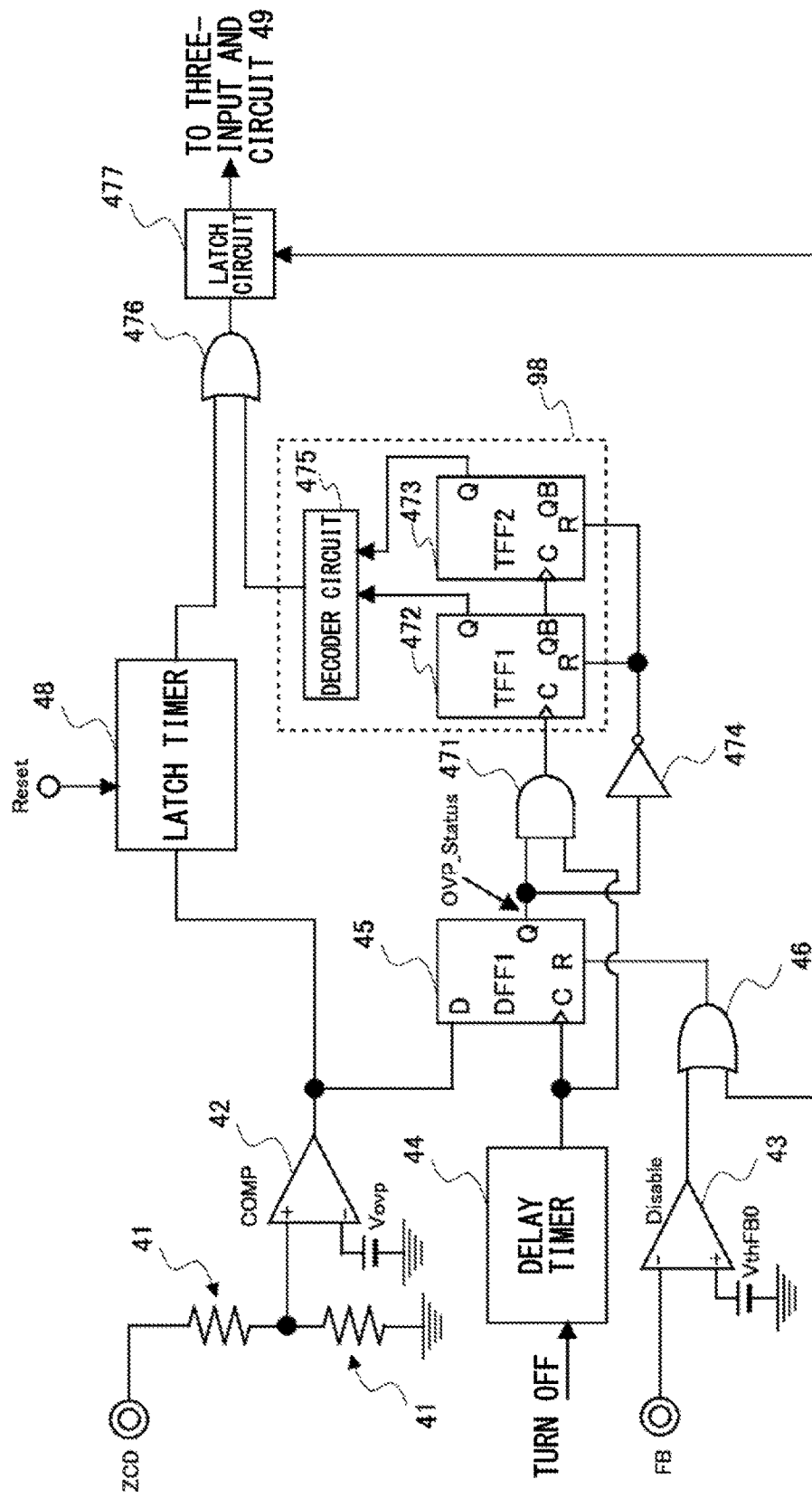
FIG. 9 shows an example of another OVP circuit 300 used in another switched-mode power supply circuit 100 according to the present embodiment.

FIG. 9 shows an example of another OVP circuit 300 used in another switched-mode power supply circuit 100 according to the present embodiment. In the OVP circuit 300 according to the present embodiment, only the output of the first comparator 42 is input to the latch timer 48. An AND circuit 471 outputs the logical conjunction of the output of the storage element 45 and the output of the delay timer 44.

As shown in FIG. 9, a counter circuit 98 may have a configuration where a T flip-flop circuit 472 and a T flip-flop circuit 473, which are toggle-type flip-flop circuits (hereinafter referred to as "T flip-flops"), are connected in series, for example. The counter circuit 98 may also have a configuration where a decoder circuit 475 is combined, which detects that the outputs of the T flip-flop circuit 472 and the T flip-flop circuit 473 become predetermined values.

The output of the AND circuit 471 is input to a clock terminal C of the T flip-flop circuit 472. An inverted output QB of the T flip-flop circuit 472 is input to a clock terminal C of the T flip-flop circuit 473. The T flip-flop circuit 472 and the T flip-flop circuit 473 are reset by the signal into which the output of the storage element 45 is inverted by an inverter circuit 474.

An OR circuit 476 outputs the logical disjunction of the output of the latch timer 48 and the output of the counter circuit 98. A latch circuit 477 stores the output of the OR circuit 476.

Figure 10:
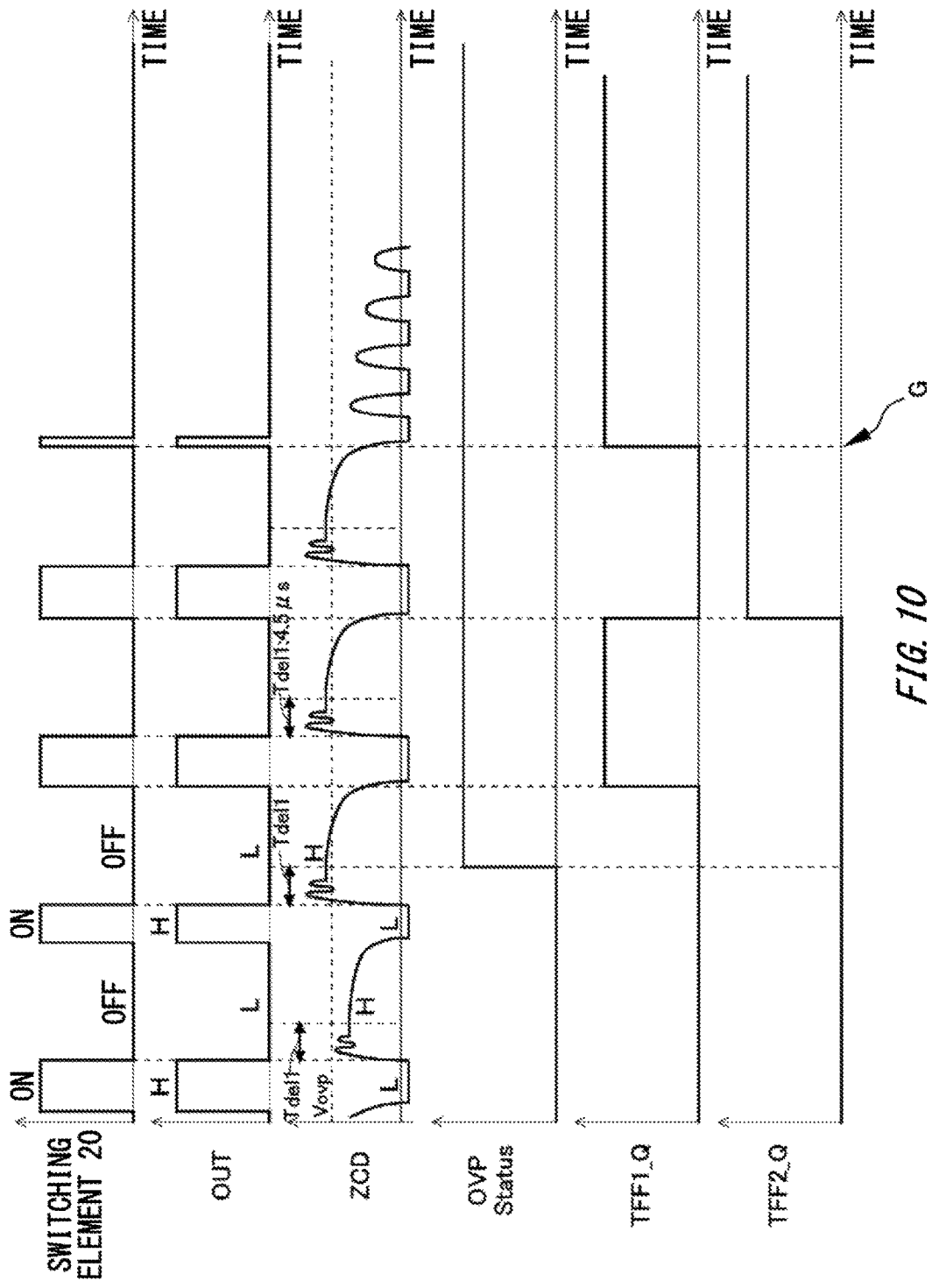
FIG. 10 is an example timing chart showing the operation of another switched-mode power supply circuit 100 according to the present embodiment.

FIG. 10 is an example timing chart showing the operation of another switched-mode power supply circuit 100 according to the embodiment of FIG. 9. FIG. 10 shows the operation of the switching element 20, the voltages of the OUT terminal and ZCD terminal of the control circuit 30, the output, OVP_Status, of the storage element 45, and the operation of the counter circuit 98 in the time series. As shown in FIG. 4, when the voltage of the OUT terminal input to the control terminal 32 is at H level, the switching element 20 is turned on, and when it is at L level, the switching element 20 is turned off.

When the voltage of the ZCD terminal exceeds the first reference voltage Vovp, the latch timer 48 first starts measurement. The latch timer 48 achieves a function to compulsorily perform the latch protection of the switched-mode power supply circuit 100 by pulling up the ZCD terminal of the control circuit 30 with an external signal. The latch timer 48 also achieves a function to protect the switched-mode power supply circuit 100 from overvoltage state when the output voltage of the switched-mode power supply circuit 100 remains high even after the switching stops, and the time period for which the output of the first comparator 42 is at H level exceeds a predetermined time (for example, 60 µs).

In an initial state where the outputs of the storage element 45 and the counter circuit 98 are all at L level, when the storage element 45 reads an H level output of the first comparator 42 in synchronization with falling of the output of the delay timer 44, the output of the storage element 45 becomes H level. At this time, the output of the AND circuit 471 is at L level. Subsequently, when the output of the delay timer 44 rises, the output of the AND circuit 471 becomes H level, and the counter circuit 98 receives this output from the clock terminal and then performs a count-up operation of incrementing the number of counts by one. Note that, because the delay timer 44 is a circuit that delays only the falling of an input signal, the timing at which the output of the delay timer 44 rises is the same as the timing at which the OUT terminal voltage rises.

Subsequently, when a cycle in which the storage element 45 reads an H level output of the first comparator 42 is continuously repeated a plurality of times, the counter circuit 98 counts up by the number of the repeated cycles. If the storage element 45 reads an L level output of the first comparator 42 during those cycles, the output of the storage element 45 becomes L level. The output of the storage element 45, which has become L level, is inverted to H level by the inverter circuit 474, and is input to the counter circuit 98 as a reset signal. Accordingly, the counter circuit 98 is reset, and the number of counts becomes zero.

The counter circuit 98 starts counting up from the next cycle of the cycle in which the output of the storage element 45 becomes H level. In the present example, when the counter circuit 98 continues to read an H level output of the storage element 45 for three cycles, the outputs Q of the T flip-flop circuit 472 and the T flip-flop circuit 473 both become H level. The decoder circuit 475 determines a condition where the outputs of the T flip-flop circuit 472 and the T flip-flop circuit 473 are both H level, that is, a condition where the counted value of the counter circuit 98 is three to be an overvoltage state, and changes the output from originally L level to H level. This change is conveyed to the latch circuit 477 via the OR circuit 476. This timing is indicated by G in FIG. 10.

The latch circuit 477 is an RS (Reset/Set) flip-flop circuit, for example. When the output of the OR circuit 476 becomes H level, the latch circuit 477 is set, and inputs a latch signal (an H level output) to the three-input AND circuit 49.

In the present example, when the voltage of the ZCD terminal continues to exceed the first reference voltage Vovp for three cycles, the latch protection is operated, for example. Even if the voltage of the ZCD terminal exceeds the first reference voltage Vovp, as long as the voltage of the ZCD terminal does not exceed the first reference voltage Vovp in a subsequent cycle before the counter circuit 98 counts a predetermined number of times (three times in the present example), the latch protection is not operated.

Figure 11:
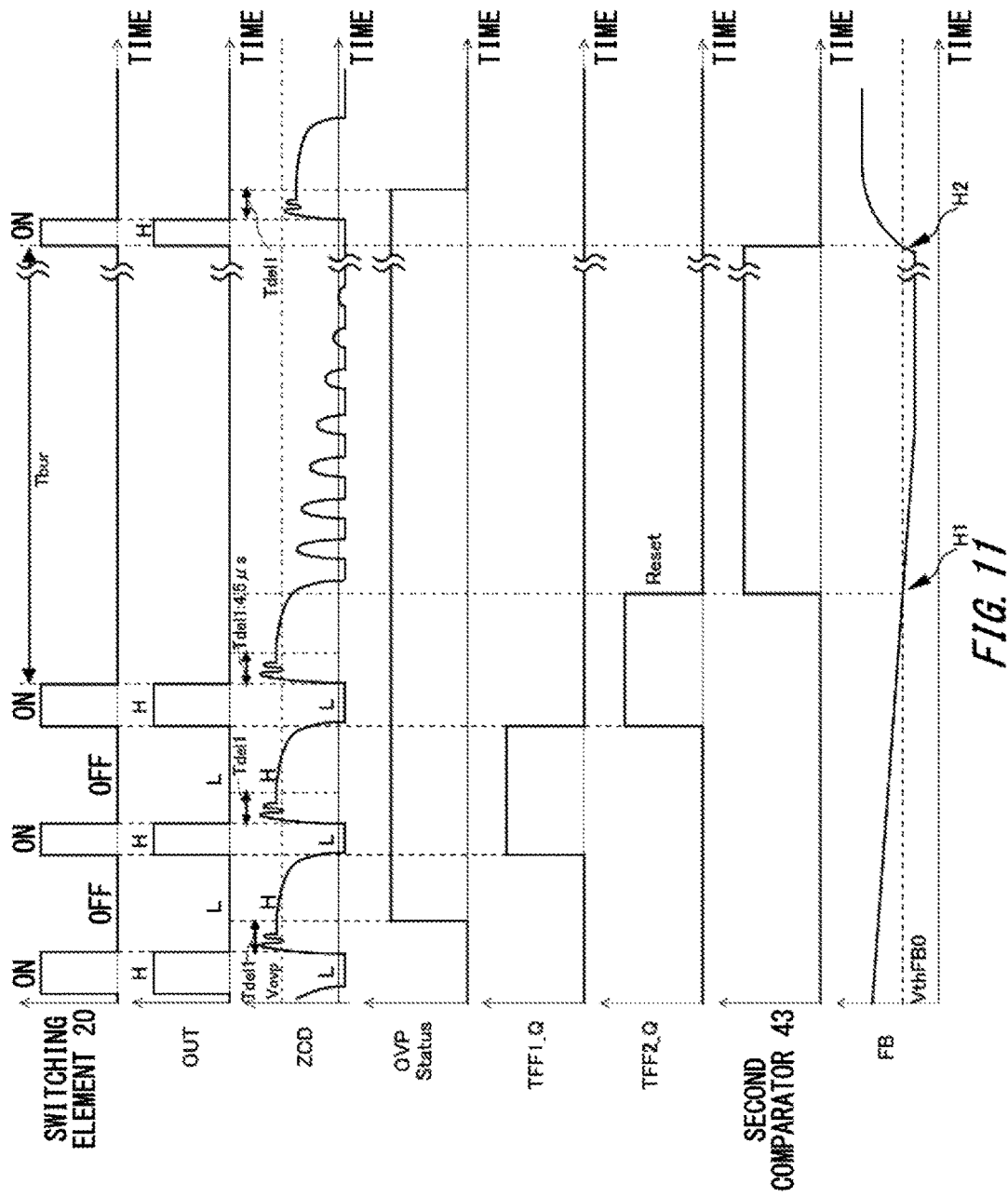
FIG. 11 is another example timing chart showing the operation of another switched-mode power supply circuit 100 according to the present embodiment.

FIG. 11 is another example timing chart showing the operation of another switched-mode power supply circuit 100 according to the present embodiment. FIG. 11 shows the operation of the switching element 20, the voltages of the OUT terminal and ZCD terminal of the control circuit 30, the output, OVP_Status, of the storage element 45, the outputs of the T flip-flop circuit 472 and T flip-flop circuit 473 of the counter circuit 98, the output of the second comparator 43, and the voltage of the FB terminal in the time series. Note that for the output OVP_Status of the storage element 45, a case where the storage element 45 is not reset by the output of the second comparator 43 is shown in order to present the role of the second comparator 43.

According to the switched-mode power supply circuit 100 of the present example, if the switched-mode power supply circuit 100 enters a switching stop period Tbur in the burst-mode operation with one time of counting up of the counter circuit 98 being left until the latch protection is operated, an H level signal is output from the second comparator 43 when the voltage fed back to the FB terminal decreases to lower than the second reference voltage VthFB0. When the H level signal is output from the second comparator 43, the storage element 45 is reset and the output of the storage element 45 becomes L level. The L level output of the storage element 45 is inverted by the inverter circuit 474, and the counter circuit 98 is reset. This timing is indicated by H1 in FIG. 11. Accordingly, at the rise timing of the OUT terminal voltage in the first cycle after the switching stop period Tbur in the burst-mode operation ends at the timing of H2 shown in FIG. 11 and the switching of the switching element 20 restarts, the protection operation can be prevented from being erroneously performed by the switched-mode power supply circuit 100 despite the fact that an overvoltage state is canceled in actuality.

Note that, while FIG. 11 shows an example where the number of times of overvoltage detection of the counter circuit 98 is reset at the same timing as the timing indicated by H1, at which an H level signal is output from the second comparator 43, the timing of resetting the number of times of overvoltage detection of the counter circuit 98 may be any timing corresponding to the stop timing in the burst-mode operation. That is, it may be any timing after the voltage corresponding to the voltage of the output terminal 28 decreases to lower than the second reference voltage VthFB0 and before the switching stop period Tbur ends.

Note that, while in FIG. 11 the counter circuit 98 is reset using the voltage fed back from the output terminal 28, any signal that controls switching to stopping in the burst-mode operation may be used to reset the counter circuit 98.

Patent Document 1 discloses, in FIG. 1, FIG. 6 and FIG. 7, a switched-mode power supply device in which an overvoltage state is determined when the voltage of an OVP terminal continues to exceed a threshold for a larger number of cycles than a predetermined number, in a manner similar to the present example, and a semiconductor device used for the switched-mode power supply device. In the switched-mode power supply device in Patent Document 1, when a switching stop period is entered, the switched-mode power supply device does not perform switching, and therefore the output voltage gradually decreases. Accordingly, an overvoltage state of the switched-mode power supply device is canceled during the switching stop period.

However, after counting one less than the number of cycles to determine that the switched-mode power supply device is in an overvoltage state immediately before starting a switching stop period in the burst-mode operation, in the first switching cycle after the switching stop period ends, if noise is input to the OVP terminal due to lightning surge or the like and the voltage of the OVP terminal exceeds a threshold, a counter circuit 98 ends counting a predetermined number. Accordingly, despite the fact that the overvoltage state of the switched-mode power supply device is canceled during the switching stop period in actuality, the switched-mode power supply device erroneously performs protection operation. In contrast, according to the switched-mode power supply circuit 100 of the present example, even if noise is involved during the first switching cycle after ending of a switching stop period Tbur, protection operation is not erroneously performed.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A switched-mode power supply circuit that performs a burst-mode operation to stop and restart switching, comprising:
    a power supply that supplies DC voltage;
    a switching element that is connected to the power supply and controls the switching;
    a first comparator that detects whether an output voltage of the switched-mode power supply circuit is higher than a predetermined voltage;
    a storage element that stores an output of the first comparator according to a timing of controlling the switching by the switching element; and
    a determination unit that (i) comprises a latch timer that performs a measurement of a time period for which at least one of an output of the first comparator or an output of the storage element continues to be higher than the predetermined voltage, and (ii) if the latch timer is not reset within a predetermined elapsed time after the latch timer starts the measurement, determines that the switched-mode power supply circuit is in an overvoltage state, wherein
    the switched-mode power supply circuit resets the latch timer at a timing corresponding to a switching stop timing in the burst-mode operation.

2. The switched-mode power supply circuit according to claim 1, wherein the switched-mode power supply circuit resets the latch timer according to a feedback voltage corresponding to the output voltage of the switched-mode power supply circuit.

3. The switched-mode power supply circuit according to claim 1, wherein the switched-mode power supply circuit resets the latch timer at a same timing as the switching stop timing in the burst-mode operation.

4. The switched-mode power supply circuit according to claim 1, wherein:
    the storage element is a flip-flop circuit; and
    the flip-flop circuit stores an output of the first comparator in synchronization with a clock signal, and outputs a signal to reset the latch timer when a reset signal is input to the flip-flop circuit.

5. The switched-mode power supply circuit according to claim 1, further comprising a transformer, wherein:
    the transformer comprises a primary winding, a secondary winding that is magnetically coupled with the primary winding and has an opposite polarity to the primary winding, and an auxiliary winding that is magnetically coupled with the primary winding and has the opposite polarity to the primary winding;
    the power supply is connected to the primary winding;
    the switching element controls conduction between the power supply and the primary winding; and
    the switched-mode power supply circuit generates a control signal for the switching element based on a feedback voltage corresponding to the output voltage of the switched-mode power supply circuit and a voltage induced in the auxiliary winding.

6. The switched-mode power supply circuit according to claim 5, further comprising a second comparator, wherein:
    the first comparator compares a first input voltage and a first reference voltage, the first input voltage being the voltage induced in the auxiliary winding, the first reference voltage being a threshold of the overvoltage state, and if the first input voltage is higher than the first reference voltage, outputs a signal indicating the overvoltage state;
    the second comparator outputs a signal instructing to stop switching based on a result of comparing a second input voltage and a second reference voltage, the second input voltage being the feedback voltage corresponding to the output voltage of the switched-mode power supply circuit, the second reference voltage being a threshold on whether the second input voltage is an excessively low voltage; and
    the switched-mode power supply circuit resets the latch timer according to the output of the second comparator.

7. A switched-mode power supply circuit that performs a burst-mode operation to stop and restart switching, comprising:
    a power supply that supplies DC voltage;
    a switching element that is connected to the power supply and controls the switching;
    a first comparator that detects whether an output voltage of the switched-mode power supply circuit is higher than a first predetermined reference voltage;
    an overvoltage detection circuit that detects whether the output voltage of the switched-mode power supply circuit is an overvoltage according to a timing of controlling the switching by the switching element;
    a second comparator that compares a feedback voltage corresponding to the output voltage of the switched-mode power supply circuit and a second predetermined reference voltage and outputs a signal based on a comparison result to the overvoltage detection circuit; and
    a latch circuit that generates a latch signal when a detected number of times an overvoltage is continuously detected by the overvoltage detection circuit reaches a predetermined number of times, wherein
    the switched-mode power supply circuit resets the detected number of times at a timing corresponding to a switching stop timing in the burst-mode operation.

8. The switched-mode power supply circuit according to claim 7, wherein the switched-mode power supply circuit resets the detected number of times according to the feedback voltage corresponding to the output voltage of the switched-mode power supply circuit.

9. The switched-mode power supply circuit according to claim 7, wherein the switched-mode power supply circuit resets the detected number of times at a same timing as the switching stop timing in the burst-mode operation.

10. The switched-mode power supply circuit according to claim 7, further comprising a counter circuit that counts the detected number of times, wherein:
    the latch circuit generates the latch signal when the detected number of times counted by the counter circuit reaches a predetermined number of times; and
    the switched-mode power supply circuit resets the counter circuit at the timing corresponding to the switching stop timing in the burst-mode operation.

11. A control circuit for a switched-mode power supply that performs a burst-mode operation to stop and restart switching, comprising:

a first comparator that detects whether an output voltage of the switched-mode power supply is higher than a predetermined voltage;
a storage element that stores an output of the first comparator; and
a determination unit that (i) comprises a latch timer that operates based on the output of the first comparator and an output of the storage element, and (ii) if the latch timer is not reset within a predetermined time after the latch timer starts operating, determines that the switched-mode power supply is in an overvoltage state, wherein the storage element is reset based on a feedback voltage corresponding to the output voltage of the switched-mode power supply.

12. A control circuit for a switched-mode power supply that performs a burst-mode operation to stop and restart switching, comprising:
a first comparator that detects whether an output voltage of the switched-mode power supply is higher than a first predetermined voltage;
an overvoltage detection circuit that detects, based on a determination result of the first comparator, whether the output voltage of the switched-mode power supply circuit is an overvoltage;
a latch circuit that generates a latch signal when a detected number of times an overvoltage is continuously detected by the overvoltage detection circuit reaches a predetermined number of times; and
a second comparator that determines whether a feedback voltage corresponding to the output voltage of the switched-mode power supply circuit is higher than a second predetermined voltage, wherein
the detected number of times the overvoltage is continuously detected by the overvoltage detection circuit is reset based on a determination result of the second comparator.

* * * * *